United States Patent [19]

Grasset et al.

[11] Patent Number: 4,534,942
[45] Date of Patent: Aug. 13, 1985

[54] APPARATUS FOR REDUCING THE CHANCES OF IGNITION AND EXPLOSION FROM THE DECOMPOSITION OF HIGH-PRESSURE INDUSTRIAL PROCESS ETHYLENE GASES

[75] Inventors: Daniel Grasset, Par Lillebonne; Bernard Martinot, Lillebonne, both of France

[73] Assignee: Societe Chimique des Charbonnages--CdF CHIMIE, Paris, France

[21] Appl. No.: 406,997

[22] Filed: Aug. 10, 1982

Related U.S. Application Data

[63] Continuation of Ser. No. 143,631, Apr. 25, 1980, abandoned.

[30] Foreign Application Priority Data

Apr. 25, 1979 [FR] France .................................. 79 10442

[51] Int. Cl.³ .......................... G05B 9/00; C08F 2/34; C08G 85/00
[52] U.S. Cl. .................................. 422/117; 422/113; 422/131; 526/71
[58] Field of Search ............... 422/112, 113, 117, 131; 169/45, 48, 66, 68, 70; 220/88 R, 88 B; 526/71

[56] References Cited

U.S. PATENT DOCUMENTS

| | | | |
|---|---|---|---|
| 2,552,472 | 5/1951 | Whidden | 220/88 B |
| 3,781,256 | 12/1973 | Sadee et al. | |
| 3,871,458 | 3/1975 | Damazet | 169/45 |
| 3,895,926 | 7/1975 | Lerner | 55/84 |
| 4,115,638 | 9/1978 | Becker et al. | 528/502 |

FOREIGN PATENT DOCUMENTS 52-39632 10/1977 Japan .

Primary Examiner—Michael S. Marcus
Attorney, Agent, or Firm—Finnegan, Henderson, Farabow, Garrett & Dunner

[57] ABSTRACT

An apparatus for evacuating the gases resulting from the decomposition of industrial process gases, such as ethylene, contained in a vessel under high pressure is adjacent to the vessel. The apparatus comprises:
(1) at least one safety means separating the apparatus from the vessel;
(2) a reservoir with a volume which is 2 to 100 times that of the vessel;
(3) at least one connecting pipe between the vessel and the reservoir; and
(4) at least one chimney between the reservoir and the atmosphere.

The apparatus is useful for the recovery of decomposition gases for the purpose of preventing atmospheric pollution. The risk of explosion is reduced by evacuating decomposition gases through the apparatus.

24 Claims, 1 Drawing Figure

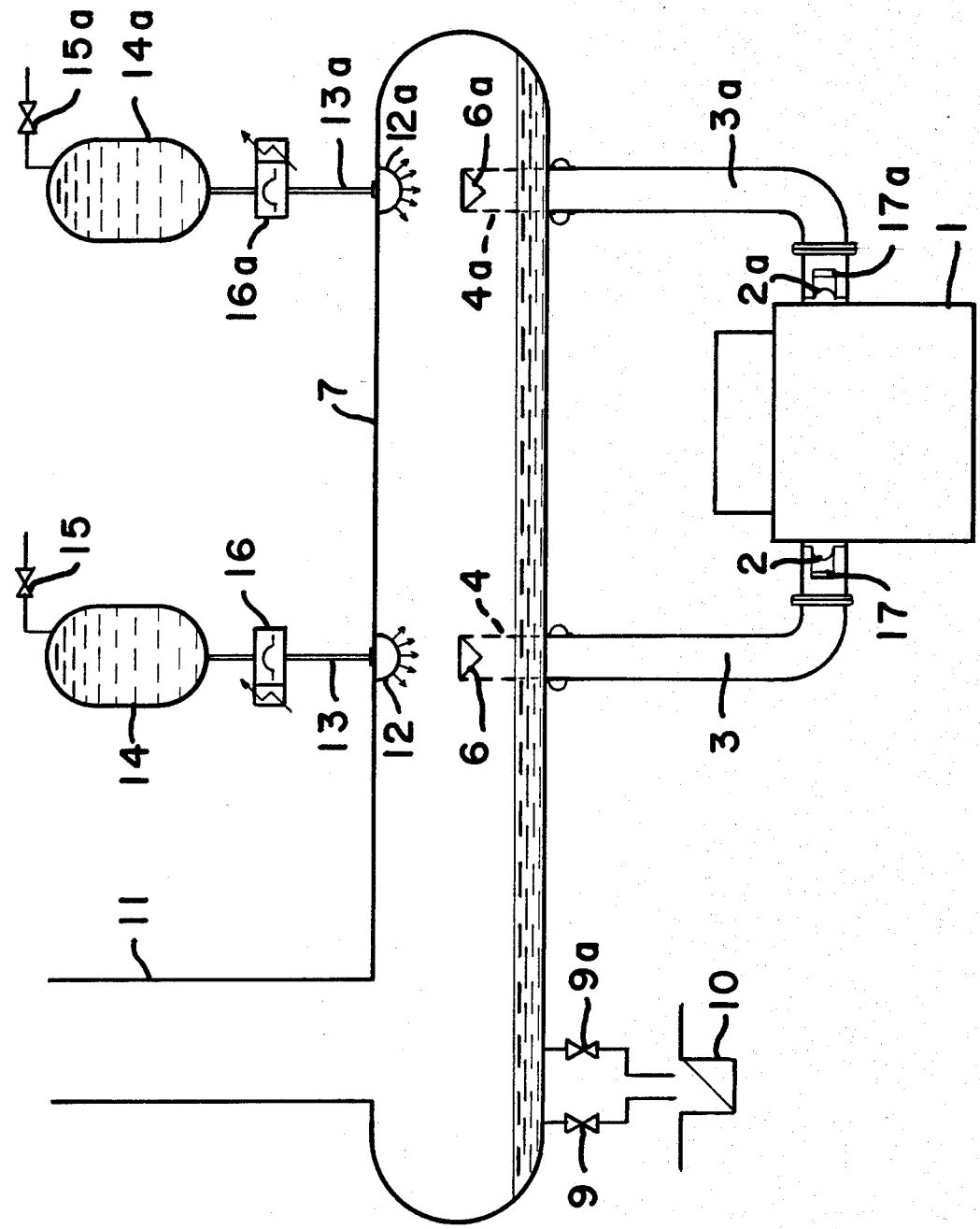

APPARATUS FOR REDUCING THE CHANCES OF IGNITION AND EXPLOSION FROM THE DECOMPOSITION OF HIGH-PRESSURE INDUSTRIAL PROCESS ETHYLENE GASES

This is a continuation of application Ser. No. 143,631, filed 4/25/80, now abandoned.

BACKGROUND OF THE INVENTION

The present invention relates to a process and apparatus for reducing the danger of ignition and explosion from the decomposition of industrial process gases under high pressure, such as ethylene in a high-pressure polymerization plant.

It is well known that there is a danger of explosion in the presence of unstable industrial process gases maintained under pressure that are subject to decomposition. For example, it is well known that in the course of polymerizing ethylene at high pressure (approximately 300 to 3,000 bars) and at high temperature (approximately 150° C. to 350° C.), some operational difficulties such as mechanical failures or insufficient purity in the gaseous ethylene, despite careful monitoring of the pressure and temperature indicators, may result in heating a fraction, even if small, of the ethylene contained in the polymerization reactor or in the separator (operating ordinarily at a pressure between 100 and 500 bars) to a temperature exceeding about 450° C. Such heating is enough to initiate the decomposition of that fraction of ethylene into a mixture of carbon, hydrogen, and methane. Furthermore, the above-cited operating conditions for the reactor and the separator are such as to allow a rapid propagation of any initiated decomposition, invariably resulting in rapid increases in pressure and/or temperature. The reactor and separator are protected against excessive pressure by the rupture of at least one member (disk, valve, relief vent) with a safety function, whereby the decomposition products can escape into the atmosphere. Besides the polluting effect of the expulsion into the atmosphere of the pulverulent carbon, the ignition of the decomposition gases must especially be feared, because it causes violent explosions capable of material damage and human injury.

Several solutions to this problem of deleterious ignition and its consequences, seeking to meet safety requirements in case of decompression of high-pressure polymerization plants, already have been proposed, in particular by U.S. Pat. Nos. 3,781,256, 3,871,458, and 4,115,638, and by the Japanese patent applications 48-51.336/73 and 48-51.337/73 filed on May 9, 1973. All these solutions have in common that they remedy at least one of the three presumed conditions for the ignition of decomposition gases: high pressure, high temperature, and supersonic velocity of the gases. Therefore these solutions generally consist in cooling by various means the decomposition gases of which the initial temperature—as noted above—exceeds 450° C., and may in fact reach 1,500° C. Besides, in order to prevent polluting the ambient atmosphere by the decomposition gases, the recommendation is made to lower the pressure and/or the velocity of the gases below the speed of sound. In short, all these solutions are based on the hypothesis stated in the U.S. Pat. No. 3,781,256, namely that the problem of the ignition of the decomposition gases is reduced to the problem of auto-ignition of these gases due to their own high temperature.

Now the applicants have unexpectedly discovered that contrary to the teachings of the prior art, the auto-ignition of the decomposition gases due to their own high temperature is not necessarily the main cause of ignition in these gases and most of the time is only a secondary cause. This discovery results from experiments carried out on ethylene in the absence of decomposition in a reactor using rupture tests of at least one safety means, the ethylene temperature at the time immediately preceding the rupture not exceeding 200° C. These experiments have shown that despite the absence of anomalous heating prior to rupture of the safety means, an emission of flaming gas at the discharge of the evacuation pipe (chimney) and the presence of a shock wave, which propagates at a rate of approximately 500 to 700 m/s, are noted.

The observed phenomenon might be explained as follows. After the safety means has been ruptured, the air contained in the evacuation pipe (chimney) and initially at rest is passed by a pressure wave moving at a velocity that depends on its intensity and exceeds that of sound in the medium. This pressure wave therefore precedes the flow of the ethylene or of the decomposition gases in the evacuation pipe, and compresses and heats the air contained in the pipe. Further, since in general the evacuation pipe is not wholly linear but comprises at least either a curved section joining the side wall of the reactor or separator to the vertical section of the chimney or a variation in cross-section, the pressure wave as a rule will not be plane and therefore can be reflected from the walls of the evacuation pipe. These wave reflections permit wave focusing on the axis of symmetry of the pipe and therefore the heating of particular point locations in the evacuation pipe. Lastly, the possibility of successive reflections of the safety disk onto the walls of the chimney represents a third source of local heating together with that from the pressure wave and combines its effects with the others.

The heating phenomena described above suffice, even in the absence of any ethylene decomposition, to raise the temperature at particular points in the chimney to above 600° C. The diffusion phenomena, the differences in gas flow speeds in the chimney between its walls and its axis of symmetry, the variations in cross-section, and the changes in the direction of the stack contribute locally to form pre-mixing zones of air and gas. Ignition is initiated at the hot-air/ethylene interface, which moves at a speed less than that of the pressure wave and therefore lags this wave, and more precisely at the level of these pre-mixing zones. The pre-mixing zones thereafter are carried by the evacuation to the outside of the chimney; therefore they disappear rapidly from the chimney when the air is replaced by the gas. Similarly the flame is carried by the flow toward the exhaust section of the chimney, where it remains during the entire period of evacuation. Gas ignition by the pressure-wave effect as just described is enhanced by a high temperature of the gas, whereby the temperature of the air-gas mixture is increased, and consequently a decomposition gas is more likely to ignite by the pressure-wave effect than ethylene at 200° C. This increase in the temperature of the air-gas mixture thus demonstrates that auto-ignition of decomposition gases caused by their own temperature—previously considered to be the root cause of ignition—instead is a derived and secondary effect from the pressure wave.

All the previous art solutions for the ignition problem that are described in the above-cited patents sought to cool the decomposition gases either when being evacuated into the atmosphere or when being recovered. These solutions therefore failed to adequately take into account the time-parameter of the mechanism from the opening of the safety means to the end of the evacuation. This parameter, however, was found to be of crucial importance as shown by the work of applicants. The cited patents state that the duration of evacuation as a rule is between 3 and 10 seconds, and U.S. Pat. No. 3,781,256 states that the time between opening the safety means and the arrival of the gas at the cooling system is about 50 to 100 milliseconds. Under these conditions, it is not surprising that the effectiveness of the prior art solutions should have been inadequate, because, in view of applicants' observations, the duration of the non-steady-state flow phase resulting in the pressure wave effect generally is equal to or less than 25 milliseconds. Considering the discovery of the nature and the duration of the main cause of the ignition of the decomposition of gases under high pressure, such as ethylene in high-pressure polymerization equipment, the effectiveness of a process and apparatus in reducing the risk depends less on the magnitude of the implementing means than on the time of implementation. In particular, it should be noted that the recovery process of the decomposition products described in U.S. Pat. No. 4,115,638 is of a highly uncertain effectiveness when the chances of ignition are not eliminated at the discharge of the reactor or separator.

SUMMARY OF THE INVENTION

A first object of the invention is therefore to reduce the danger of ignition and consequently of explosion due to the decomposition of high-pressure industrial process gases, in particular the danger arising during the non-steady-state flow phase of the decomposition gases. A second object is to minimize the chances of ignition and explosion in the course of the non-steady-state flow phase to such a degree that the recovery of the decomposition gases, in particular for the purpose of averting any pollution, can be carried out in a perfectly safe manner.

Additional objects and advantages of the invention will be set forth in part in the description which folows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the apparatus of the invention for evacuating decomposition gases that are contained in a high-pressure vessel is adjacent to the vessel and comprises:

(a) at least one protective safety means separating the apparatus from the vessel, (b) a reservoir with a volume between 2 and 100 times that of the vessel, (c) at least one connecting pipe between the vessel and the reservoir, and (d) at least one chimney connecting the reservoir to the atmosphere.

Further in accordance with the invention, as embodied and broadly described herein, the invention comprises a process for reducing the chances of ignition and explosion resulting from the decomposition of an industrial process gas in a high-pressure vessel by evacuating the decomposition gases into the evacuation system described above.

In a preferred embodiment of the process and apparatus of the invention, the industrial process gas is ethylene in a high-pressure polymerization plant.

The accompanying drawing, which is incorporated in and constitutes a part of this specification, illustrates one embodiment of the invention and, together with the description, serves to explain the principles of the invention.

BRIEF DESCRIPTION OF THE DRAWING

The FIGURE is a schematic diagram of a system constructed in accordance with the present invention.

DESCRIPTION OF THE PREFERRED EMBODIMENTS

Reference will now be made in detail to the presently preferred embodiments of the invention, an example of which is illustrated in the accompanying drawing.

In accordance with the invention, the industrial process gas may be any gas held in a vessel under high pressure that is subject to decomposition and the danger of ignition and explosion. The invention is especially useful in reducing the risk of explosion from the decomposition of ethylene in high-pressure polymerization equipment. The invention will therefore be described in detail with respect to the decomposition of ethylene. It will be understood by those of ordinary skill in the art, however, that the process and apparatus described herein may easily be applied to reducing the risk of explosion from decomposition of other high-pressure industrial process gases.

As previously indicated, in the preferred embodiments of the present invention the high-pressure vessel in the case of ethylene constitutes either the reactor (pressure: about 300 to 3,000 bars) in which the ethylene polymerization is carried out, or the separator (pressure: 100 to 500 bars) in which the polymer formed is separated from the unreacted ethylene. As a rule this vessel is of cylindrical or tubular shape. In accordance with the invention, its side wall is provided with at least one, and generally several, protective safety means. The reservoir of the system of the invention preferaby communicates with the vessel by a number of conduits equal in number to that of the safety means. This reservoir preferably is oblong, cylindrical or quasi-cylindrical in shape, and it is preferably arranged along a horizontal axis whereby its average cross-section in a horizontal plane is preferably from 100 to 10,000 times that of the totality of the safety means. The connecting pipe from the vessel preferably enters the reservoir either at the bottom or the top of the reservoir. The reservoir may be arranged at a level either higher or lower than that of the vessel.

The system of the invention may comprise several chimneys connecting the reservoir to the atmosphere. It preferably, however, comprises only one such chimney in order to eliminate the danger of delayed ignition of the gases issuing from one chimney by those from another. The single chimney preferably is located vertically above the reservoir. In the most common case it will be desired to provide each high-pressure vessel of the polymerization plant (reactor and separator) with one apparatus of the invention, and care preferably should be taken for the above reasons to locate the chimney of the reactor evacuation system at that end of the reservoir of the system that is farthest from the end of the reservoir of the separator evacuation system on which is located the chimney of this latter system.

In a preferred embodiment of the invention, at least one of the connecting pipes between the vessel and the reservoir is provided at its upper end with a gas-dispersing means that changes the direction of the gases arriving from the vessel and disperses them homogeneously into the reservoir. Preferably each of the connecting pipes will generally be arranged vertically between the vessel and the reservoir, except perhaps for any curved section immediately next to the vessel when the vessel is itself arranged vertically. Therefore the decomposition gases arriving at the upper end of the connecting pipe will, in the absence of suitable obstacles on their way, hit the opposite wall of the reservoir perpendicularly and be subjected to a series of reflections within an angular bundle before moving toward the chimney. The applicants have found that in order to perfect the suppression of the pressure waves passing through the evacuated gases—a suppression that is implemented by the evacuation system described so far—the direction of the gases is preferably changed as soon as they enter the reservoir so that these gases are homogeneously distributed in the reservoir and so as to render their path horizontal or nearly horizontal. As embodied herein, this is achieved in a simple manner by using as the gas dispersing means a deflecting-dispersing means fixed at the end of the connecting pipe and for instance in the shape of a cone joining the connecting pipe by a set of bars (as shown in the attached drawing) or else in the shape of a sprinkler head.

In a further preferred embodiment of the present invention, the reservoir of the evacuation system of the invention is partially filled with an inert liquid of high heat of vaporization to cool the evacuated gases. The oblong shape along a horizontal axis of the reservoir favors efficient cooling of the gases due to the high contact surface between the gases and the inert liquid with high heat of vaporization. By inert liquid is meant a chemical compound that does not react with the ethylene and the decomposition gases and is in the liquid state under the ordinary operating conditions of the reservoir (pressure near atmospheric temperature near ambient temperature). The inert liquid of high heat of vaporization preferably is water, but may also be a halogenated hydrocarbon. In this embodiment of the invention in which the reservoir is partly filled with an inert liquid, it is preferable, when the connecting pipe enters the reservoir at its bottom, that is extend beyond the level of the inert liquid so that this liquid, in the absence of turbulence caused by evacuating the decomposition gases, is unable to enter the connecting pipe and reach the safety means and thereby possibly cause mechanical failure of the safety means or clogging of the pipe.

In a still further preferred embodiment of the present invention, the reservoir of the evacuation system of the invention may include at least one inert liquid injection means for injecting the inert liquid of high heat of vaporization, its working being operated by detection means for sensing the opening of a safety means. The inert liquid is defined as above, and preferably is the same liquid as is partially filling the reservoir. When the reservoir is provided with at least one such injection means, it preferably will be arranged along the same axis as the connecting pipe and the gas-dispersing means, if any. Operation of the liquid injection means results in cooling the evacuated decomposition gases and, if the reservoir is partly filled with inert liquid, in completing the cooling of the gases as ensured by the presence of the inert liquid. Various types of injection means may be provided, in accordance with the invention, for the reservoir of the invention, for instance one in the shape of a sprinkler head.

If in addition to reducing the danger of ignition and explosion due to the decomposition of ethylene it is desired to recover the decomposition gases to avert any atmospheric pollution, the evacuation system of the invention should furthermore preferably comprise:

(1) a safety means separating the reservoir from each chimney, (2) a recovery vessel for the evacuated gases, and (3) a connecting pipe connecting the reservoir to the recovery vessel.

This recovery vessel must be of a large volume to be able to collect at a pressure of less than 50 bars all of the contents of the high-pressure vessel where the decomposition takes place. This volume may exceed that of the reservoir and may even be several times larger. The recovery facility may furthermore include an exhaust pipe provided with a valve through which the recovered gases can be fed to a combustion system.

Finally, if it is desired to further reduce the dangers of ignition or explosion by keeping most of the evacuation system of the invention in an inert atmosphere, that is, substantially free of gases that may react with the decomposition gases (methane and hydrogen), in particular substantially free of oxygen, the chimney, or each chimney of the system may include for the purpose of limiting the consumption of the gas constituting the inert atmosphere a sealing means occupying the entire cross-section of the chimney, for instance a rubber balloon means which is inflated by a gas at a pressure exceeding that in the reservoir.

The invention will be better understood by referring to the schematic illustration in the drawing. In the embodiment shown, reference 1 denotes the high-pressure vessel (reactor or separator) provided with its safety disks 2 and 2a separating it from the connecting pipes 3 and 3a. The upper sections 4 and 4a of these pipes are perforated with slits and at their tops include spreader-and-deflector means 6 and 6a respectively in the shape of inverted cones. The pipes 3 and 3a enter the oblong and horizontal reservoir 7 at its bottom. The bottom of reservoir 7 is filled with a volume of water 8 and it will be noted that the top of the pipes 3 and 3a exceeds the level of the water surface. Valves 9 and 9a also are provided in the bottom of the reservoir to evacuate part of the water into an overflow 10 when required. The single chimney 11 is located at one end of the reservoir 7 and permits evacuating the contents of vessel 1 to the atmosphere. The reservoir 7 furthermore comprises water-injection means 12 and 12a located straight above the gas dispersing means 6 and 6a. These means 12 and 12a are connected by pipes 13 and 13a to water reservoirs 14 and 14a, which are fed through valves 15 and 15a by water supplies (not shown). The operation of means 12 and 12a is controlled by the opening of explosive valves 16 and 16a, which opening in turn is controlled by the detection of rupture in at least one of the disks 2 and 2a by detectors 17 and 17a located in the immediate vicinity of the disks. The control means connecting the detectors 17 and 17a to the valves 16 and 16a are not illustrated.

According to the process of the present invention, the chances of an explosion due to industrial process gas decomposition within a high-pressure vessel are reduced by evacuation of the decomposition gas into an evacuation apparatus such as described and illustrated above.

It is important to specify that, in the case of ethylene, when the process of the invention includes a recovery phase for the decomposition gases within a recovery system as described above, the recovery phase must be carried out at pressures less than 50 bars, at temperatures less than 450° C. and at oxygen concentrations less than 5%. Moreover, when the process of the invention involves maintaining the larger part of the evacuation system under an inert atmosphere, preferably the inert gas pressure within the evacuation system is less than 1.5 bars. Finally the process of the invention may be combined with known processes for reducing the danger of ignition and explosion due to industrial process gas decomposition under high pressure, in particular with the processes cooling the decomposition gases as described for instance in U.S. Pat. No. 3,781,256 and 3,871,458.

It will be apparent to those skilled in the art that various modifications and variations could be made in the apparatus and process of the invention without departing from the scope or spirit of the invention. In particular, although the invention has been described for the purpose of illustration with respect to ethylene, it is equally applicable to other industrial process gases, as will be readily understood by those having ordinary skill in the art.

What is claimed is:

1. In combination, a high-pressure vessel operating at a pressure of at least 100 bars and an apparatus for evacuating the decomposition gases of ethylene contained in said high-pressure vessel, said apparatus being adjacent to said vessel and comprising:
   (a) means defining a reservoir with a volume between 2 and 100 times that of the vessel;
   (b) conduit means connecting and communicating said vessel to said reservoir means and having at least one safety means separating said apparatus from said vessel for releasing said decomposition gases from said vessel, said conduit means being located at least in part outside of both said vessel and said reservoir means whereby said vessel and said reservoir means are in a spaced-apart relationship, said conduit means constituting means for passing said decomposition gases released from said vessel to said reservoir means;
   (c) at least one vertically oriented chimney connecting the reservoir means to the atmosphere; and
   (d) a sealing means across the entire cross-section of said chimney, whereby an inert atmosphere is provided within said chimney.

2. Apparatus according to claim 1, wherein said sealing means is a rubber balloon means inflated at a pressure exceeding that in the reservoir means.

3. Apparatus according to claim 1, wherein said conduit means comprises at least one connecting pipe, the number of connecting pipes between the vessel and the reservoir means being equal to the number of safety means.

4. Apparatus according to claim 1, wherein the reservoir means is oblong in shape and arranged along a horizontal axis, and its average cross-section in the horizontal plane is 100 to 10,000 times that of the sum of the safety means.

5. Apparatus according to claim 1, wherein a single chimney connects the reservoir means to the atmosphere.

6. Apparatus according to claim 1, further comprising an inert liquid having a high heat of vaporization partially filling said reservoir means at all times that said vessel is in normal operation.

7. Apparatus according to claim 1, further comprising at least one inert liquid injection means opening into said reservoir means and means for detecting the opening of said safety means and activating said inert liquid injection means.

8. Apparatus according to claim 7, wherein the inert liquid injection means is arranged along the same axis as the conduit means between the vessel and reservoir means.

9. In combination, a high pressure vessel and an apparatus for evacuating the decomposition gases of ethylene contained in said high-pressure vessel, said apparatus being adjacent to said vessel and comprising:
   (a) means defining a horizontally disposed oblong reservoir whose horizontal dimension is significantly greater than its vertical dimension with a volume between 2 and 100 times that of the vessel;
   (b) conduit means connecting and communicating said vessel to said reservoir means and having at least one safety means separating said apparatus from said vessel for releasing said decomposition gases from said vessel, said conduit means constituting means for passing said decomposition gases released from said vessel to said reservoir means, wherein said conduit means is provided with a terminating end of said conduit means extending into said reservoir means and above a bottom wall of said reservoir means, and with means at the terminating end of said conduit means in said reservoir means and spaced from the horizontal ends of said reservoir means for dispersing said gases substantially in a horizontal direction, whereby the shape of said oblong reservoir means cooperates with said dispersing means to ensure substantially horizontal dispersion of said gases; and
   (c) at least one vertically oriented chimney connecting the reservoir means to the atmosphere.

10. Apparatus according to claim 9, wherein said conduit means comprises at least one connecting pipe, the number of connecting pipes between the vessel and the reservoir means being equal to the number of safety means.

11. Apparatus according to claim 9, wherein the reservoir means is oblong in shape and arranged along a horizontal axis, and its average cross-section in the horizontal plane is 100 to 10,000 times that of the sum of the safety means.

12. Apparatus according to claim 9, wherein a single chimney connects the reservoir means to the atmosphere.

13. Apparatus according to claim 9, further comprising an inert liquid having a high heat of vaporization partially filling said reservoir means at all times that said vessel is in normal operation.

14. Apparatus according to claim 9, further comprising at least one inert liquid injection means opening into said reservoir means and means for detecting the opening of said safety means and activating said inert liquid injection means.

15. Apparatus according to claim 14, wherein the inert liquid injection means is arranged along the same axis as the conduit means between the vessel and reservoir means.

16. In combination, a high-pressure vessel operating at a pressure of at least 100 bars and an apparatus for evacuating the decomposition gases of ethylene contained in said high-pressure vessel, said apparatus being adjacent to said vessel and comprising:
   (a) means defining a horizontally disposed oblong reservoir whose horizontal dimension is significantly greater than its vertical dimension with a volume between 2 and 100 times that of the vessel;
   (b) conduit means connecting and communicating said vessel to said reservoir means and having at least one safety means separating said apparatus from said vessel for releasing said decomposition gases from said vessel, said conduit means being located at least in part outside of both said vessel and said reservoir means whereby said vessel and said reservoir means are in a spaced-apart relationship, said conduit means constituting means for passing said decomposition gases released from said vessel to said reservoir means, an outlet end of said conduit means terminating above a wall of said reservoir means, wherein said conduit means is provided with dispersing means at the terminating end of said conduit means in said reservoir means for dispersing said gases substantially in a horizontal direction, whereby the shape of said oblong reservoir means cooperates with said dispersing means to ensure substantially horizontal dispersion of said gases;
   (c) at least one vertically oriented chimney connecting the reservoir means to the atmosphere; and
   (d) at least one inert liquid injection means arranged along the same axis as the conduit means between the vessel and reservoir means directly above the outlet end of said conduit means, said inert liquid injection means opening into said reservoir means, and means for detecting the opening of said safety means and activating said inert liquid injection means.

17. Apparatus according to claim 16, wherein said conduit means comprises at least one connecting pipe, the number of connecting pipes between the vessel and the reservoir means being equal to the number of safety means.

18. Apparatus according to claim 16, wherein said reservoir means is located vertically above said vessel in spaced-apart relationship from said vessel.

19. Apparatus according to claim 16, wherein a single chimney connects the reservoir means to the atmosphere.

20. Apparatus according to claim 16, further comprising an inert liquid having a high heat of vaporization partially filling said reservoir means at all times that said vessel is in normal operation.

21. Apparatus according to claim 16, wherein said reservoir means has an average cross-section in the horizontal plane 100 to 10,000 times that of the sum of said safety means.

22. Apparatus according to claim 16, wherein said conduit means comprises at least one connecting pipe extending vertically and perpendicularly to the base of said reservoir means.

23. Apparatus according to claim 22, wherein said at least one connecting pipe extends a substantial distance into and above the base of said reservoir means, and wherein said reservoir means further comprises an inert liquid having a high heat of vaporization partially filling said reservoir means at all times that said vessel is in normal operation, the level of said inert liquid in said reservoir means being lower than the top end of said at least one connecting pipe.

24. Apparatus according to claim 23, wherein said at least one connecting pipe comprises two connecting pipes.

* * * * *